July 26, 1927.
F. W. KRONE
TIRE CONSTRUCTION
Filed Aug. 4, 1926
1,636,779
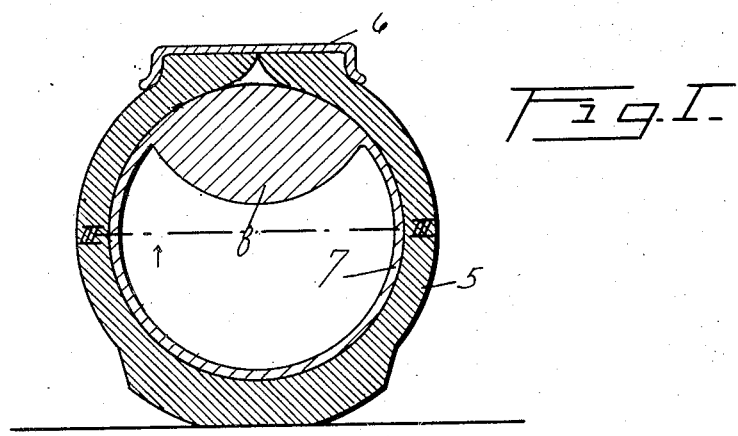
Fig. I.
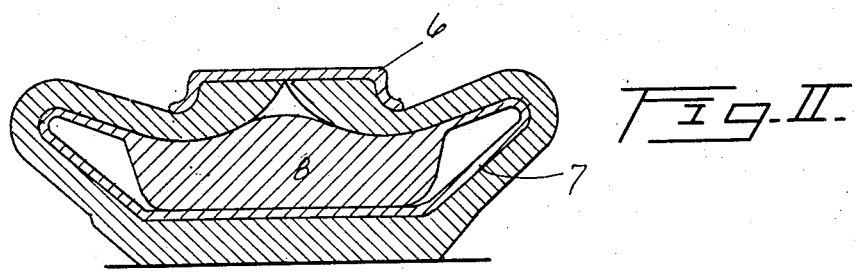
Fig. II.
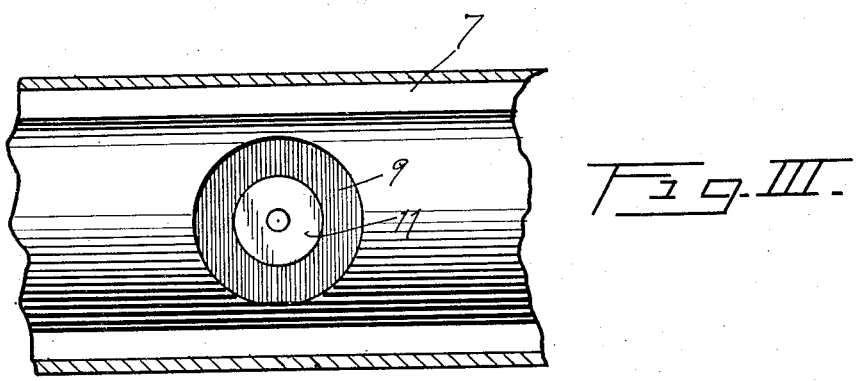
Fig. III.
INVENTOR.
F. W. KRONE
BY Victor J. Evans
ATTORNEY.

Patented July 26, 1927.

1,636,779

UNITED STATES PATENT OFFICE.

FREDERICK W. KRONE, OF SAN FRANCISCO, CALIFORNIA.

TIRE CONSTRUCTION.

Application filed August 4, 1926. Serial No. 127,104.

This invention relates to improvements in tire construction and has particular reference to the construction of an inner tube.

The principal object of this invention is to provide means whereby the deflating of the tube will not permit the tire proper or shoe to become rim cut as now occurs when the air escapes from the tire.

Another object is to produce a tube which conforms to all standard requirements.

A still further object is to produce a tube which will not be materially increased in cost of manufacture.

Other objects and advantages will be apparent during the course of the following description.

In the accompanying drawings forming a part of this specification, and in which like numerals are employed to designate like parts throughout the same, Figure I is a vertical cross section of a tube, as the same would appear upon a tire rim, Figure II is a cross section of a tire having my tube therein with the same deflated, and Figure III is a cross section taken on the line 3—3 of Figure I, looking in the direction of the arrow and taken at a point adjacent the valve stem.

With balloon tires which are very flexible, when for any reason the air within the tube escapes, the tire, as a whole settles, until the rim rests upon the tire and if the vehicle is propelled for any distance, the tire will become rim-cut. It is very simple with balloon tires to cut the tires, due to the fact that the tire may settle gradually until the rim is in a position to cut the tire, without the occupant of the vehicle being aware of this fact. I have, therefore, provided means whereby when the tire becomes deflated, a cushion will be interposed between the tire and the rim.

In the accompanying drawings wherein for the purpose of illustration is shown a preferred embodiment of my invention, the numeral 5 designates the customary outer casing or shoe which is mounted upon a rim 6 and may be of any well-known construction. Within this shoe is placed a tube 7 which tube serves the purpose of maintaining the air within the shoe. The ordinary tube is of circular construction having the same thickness of wall throughout its cross sectional area.

I have improved the customary tube by providing a cushion 8 of solid rubber and of considerable thickness and attaching this cushion to the tube at a point adjacent the rim.

At 9 I have shown an opening within the cushion within which the inner end of the valve stem is positioned. This is illustrated at 11 in Figure III. The result of this construction is that when the tire is inflated as shown in Figure I, the cushion 8 assumes the position of this figure.

When the tire becomes deflated, as illustrated in Figure II, the cushion 8 comes into contact with the opposite wall of the tube and is finally compressed in such a manner that it serves as a support and prevents the rim from cutting through the shoe. This is best illustrated in Figure II.

While the cushion is shown as integrally formed with the tube, nevertheless, it is to be understood that it may be made as an attachment to be vulcanized to the tube and can either be made entirely of rubber or a composition consisting of rubber and fabric.

It will thus be seen that by this simple arrangement of a cushion formed within a tube, I have been able to accomplish all of te objects above set forth, and in addition thereto will serve to prevent an auto from skidding should a blowout occur.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

A rubber inner tube for tires equipped with an interior solid rubber annulus of increased thickness formed integral with said tube and only on the rim zone thereof and of a thickness less than half the cross sectional dimension of the tube; the remainder of the cross section of the tube being of substantially the standard thickness of inner tubes.

In testimony whereof I affix my signature.

FREDERICK W. KRONE.